(12) United States Patent
Lin

(10) Patent No.: US 7,315,458 B1
(45) Date of Patent: Jan. 1, 2008

(54) FIXING MECHANISM FOR FIXING A FUNCTIONAL EXTENSION CARD TO A MECHANICAL FRAME

(75) Inventor: Linger Lin, Taipei (TW)

(73) Assignee: Inventec Corporation (TW)

( * ) Notice: Subject to any disclaimer, the term of this patent is extended or adjusted under 35 U.S.C. 154(b) by 0 days.

(21) Appl. No.: 11/510,290

(22) Filed: Aug. 24, 2006

(51) Int. Cl.
*H05K 7/04* (2006.01)

(52) U.S. Cl. .............. 361/807; 361/686; 361/726; 361/740; 361/759; 361/801; 174/50; 174/61; 174/67; 174/666

(58) Field of Classification Search .............. 361/686, 361/726, 732, 740, 752, 754, 759, 801, 807, 361/747; 174/50, 61, 67, 666; 312/223.1, 312/223.2, 223.3
See application file for complete search history.

(56) References Cited

U.S. PATENT DOCUMENTS

| | | | | |
|---|---|---|---|---|
| 4,002,381 A * | 1/1977 | Wagner et al. | .............. | 312/183 |
| 5,757,618 A * | 5/1998 | Lee | .............. | 361/686 |
| 5,812,377 A * | 9/1998 | Golbach | .............. | 361/759 |
| RE36,695 E * | 5/2000 | Holt | .............. | 312/265.6 |
| 6,069,796 A * | 5/2000 | Hastings et al. | .............. | 361/754 |
| 6,132,235 A * | 10/2000 | Kitada | .............. | 439/372 |
| 6,147,872 A * | 11/2000 | Roy | .............. | 361/754 |
| 6,246,585 B1 * | 6/2001 | Gunther et al. | .............. | 361/759 |
| 6,287,138 B1 * | 9/2001 | Kuang | .............. | 439/372 |
| 6,639,151 B1 * | 10/2003 | Chen et al. | .............. | 174/666 |
| 6,655,976 B1 * | 12/2003 | Shipe et al. | .............. | 439/328 |
| 6,937,481 B1 * | 8/2005 | Newman et al. | .............. | 361/801 |
| 2006/0018101 A1 * | 1/2006 | Huang | .............. | 361/726 |

* cited by examiner

*Primary Examiner*—Tuan T. Dinh
*Assistant Examiner*—Xiaoliang Chen
(74) *Attorney, Agent, or Firm*—Peter F. Corless; Steven M. Jensen; Edwards Angell Palmer & Dodge LLP

(57) ABSTRACT

A fixing mechanism for functional extension cards is disclosed, which can be fixed by fixing bolt thereof to the mechanical frame of a computer system having at least a first positioning hole and a second positioning hole, and to a bayonet board of the functional extension card. The fixing mechanism includes a fixing body, a spindle hole, a fixing portion, an operating portion and a first restricting portion. The body is installed on the frame by the fixing bolt to resolve the problems of the functional extension card slanting and loosening from the frame by the restriction effects respectively provided by the first restricting portion and second restricting portion of the body. The present invention is easy to operate and install to enable the functional extension card to be easily assembled into and disassembled from an extension slot of a computer system.

10 Claims, 4 Drawing Sheets

FIXING MECHANISM FOR FIXING A FUNCTIONAL EXTENSION CARD TO A MECHANICAL FRAME

BACKGROUND OF THE INVENTION

1. Field of the Invention

The present invention relates to fixing mechanisms, and more particularly, to a fixing mechanism for fixing a functional extension card to a mechanical frame, without using any screws or tools.

2. Description of Related Art

As computer systems have become more common in the workplace and in the home, there has become a need to make these computer systems more adaptable and interchangeable to allow the customization of a computer system to a particular user's needs. Also, it has become necessary to enable the user to change functions or to add new functions to the computer system. When a new hardware function is added to a computer system, the electronics for implementing this function are often contained in a self-contained, pluggable, option card. The option card contains a circuit card mounted with a variety of electronic components that implement the required electronic function. For example, the option card may provide a 3-D drawing card, a sound card, a processor, expanded memory, an I/O card, a network adaptor, or a video card or other functions or combinations of functions. The circuit card having an electronics package constructed is easily configured in a computer system by inserting the package into a provided slot of the computer system.

FIG. 1 illustrates a conventional method of fastening a functional extension card to the mechanical frame of the computer system. As shown, an functional extension card 6 is fixed on a bayonet board 5, the golden fingers of the extension card 6 are inserted into the provided slot, and then the bayonet bard 5 is fastened onto the mechanical frame 3 by a screw 7, thereby fastening the bayonet board 5 in order to fix the extension card 6 on the mechanical frame 3.

However, the foregoing method of fastening an option card has gradually failed to meet the demands of function varieties. In compliance with the operation of normal service servers, there have been increasingly numbers of functional extension cards being designed to have hot-pluggable ability on booting the system for the purpose of switching and replacing the damaged functional extension card. Thus, using screws to fasten an extension card can be disastrous because an inadvertent loose of the screw may cause short circuits and serious damages to the electrical components, which in turn may bring to a stop of a service server of a network engaging in a financial trading, causing significant damages that cannot be compensated by replacing a server unit or its peripheral components.

Moreover, the contact of the functional extension card with the extension slot also needs to be considered besides inserting the card into the slot. If a functional extension card is not securely fastened to the mechanical frame, it may easily come off due to the vibrations and thus lose the electronic function or result in bad contacts or even cause damages to the system.

Therefore, it is desirable to develop a novel mechanism that can improve on the drawbacks of prior art techniques by avoiding the use of screws or tools for assembly, and is also user-friendly.

SUMMARY OF THE INVENTION

The present invention aims to eliminate the aforementioned drawbacks, and, as such, a primary objective of the present invention is to provide a fixing mechanism for functional extension cards that is easy to operate and install without the use of a tool.

Another objective of the present invention is to provide a fixing mechanism for functional extension cards that enables a functional extension card to be easily fixed to a mechanical frame, and also is easy to disassemble for replacement.

In order to achieve the above and other objectives, the present invention provides a fixing mechanism for functional extension cards, the fixing mechanism at least comprising: a fixing body formed with two corresponding planes of a first side and a second side; a spindle hole formed on the first side of the fixing body for allowing a fixing bolt to penetrate through a first positioning hole of a mechanical frame and further through the first side of the fixing body; a fixing portion that is disposed on the first side in a protrusive manner to fix the second positioning hole of the mechanical frame; an operating portion that is connectively disposed at an opposite direction of the first positioning hole that engages the fixing portion with the mechanical frame, the operating portion being adapted to release the fixing status of the fixing portion; a first restricting portion that is formed between the first side and the second side and collectively disposed on the body, and is provided to prevent the occurrence of a functional extension card being detaching from the bayonet board thereof.

In the fixing mechanism for a functional extension card provided by the invention, a fixing bolt is employed to penetrate through a first positioning hole of the mechanical frame and further through a spindle hole formed on the first side of the fixing body to position and fix the body on the mechanical frame, allowing the body to rotate coaxially with the first positioning hole of the mechanical frame. Preferably, the fixing bolt is made of plastic so that its inherent elasticity and deformation characteristics can be employed to couple flexibly and restore to its original shape from the card switching after the fixing body is replaced or disassembled, wherein the fixing body includes a plastic body, a metallic body, or a wooden body, whereas in this preferred embodiment, the body is a plastic body.

In addition, the fixing mechanism for a functional extension card of the invention also employs a fixing portion which is disposed in a protrusive manner on the first side of the fixing body to fix the second positioning hole on the mechanical frame, wherein the first side of the fixing body is a cross-sectional concave structure that possesses elasticity and deformation characteristics, thereby enabling the fixing portion disposed on the first side of the fixing body to operate and unfasten the fixing portion by means of an operating portion thereof, which is connectively disposed at an opposite direction of the first positioning hole for fixing the fixing portion with the mechanical frame, the fixing portion being a block body that has an inclined plane and works in conjunction with the coupling of the first positioning hole and the spindle hole of the mechanical frame, thereby allowing the body to rotate to a certain point for fixing into the second positioning hole of the mechanical frame and thus fixing a bayonet board of the functional extension card.

Preferably, the fixing mechanism for a functional extension card of the invention, in addition to the first restricting portion that is formed between the first side and the second side and is connectively disposed on the body for restricting forward and backward movements of the bayonet board of the functional extension card to prevent it from coming off due to the vibrations, further includes a second restricting portion that is connectively disposed on the fixing body for restricting the functional extension card from swinging in lateral directions to prevent it from departure that may lead to bad contacts as a result. In one preferred embodiment, the fixing mechanism of the invention provides that the spindle hole, the fixing portion, the operating portion, and the first restricting portion are integrally and collectively disposed on the fixing body.

In summary, the fixing mechanism of the invention features using a fixing bolt to fix the fixing body on the mechanical frame, and a spindle hole formed on the body to position and rotate the fixing body, and further using a fixing portion to couple with a second positioning hole that is provided on the mechanical frame, thereby achieving a restriction effect of the bayonet board of a functional extension card and fixing the extension card in the extension slot. Accordingly, the fixing mechanism of the invention offers advantages over prior art techniques in that it is easy to install without using any tool to securely fasten the functional extension card to the mechanical frame, and also it is easy to disassemble for the purpose of replacement that resolves the concerns of hot-pluggable safety.

BRIEF DESCRIPTION OF DRAWINGS

The fixing mechanism for functional extension cards of the present invention can be fully understood by reading the following detailed description of the preferred embodiments, with reference made to the accompanying drawings, wherein.

DETAILED DESCRIPTION OF PREFERRED EMBODIMENT

The present invention is described in the following so that one skilled in the pertinent art can easily understand other advantages and effects of the present invention. The present invention may also be implemented and applied according to other embodiments, and the details may be modified based on different views and applications without departing from the spirit of the invention.

Figure 1:
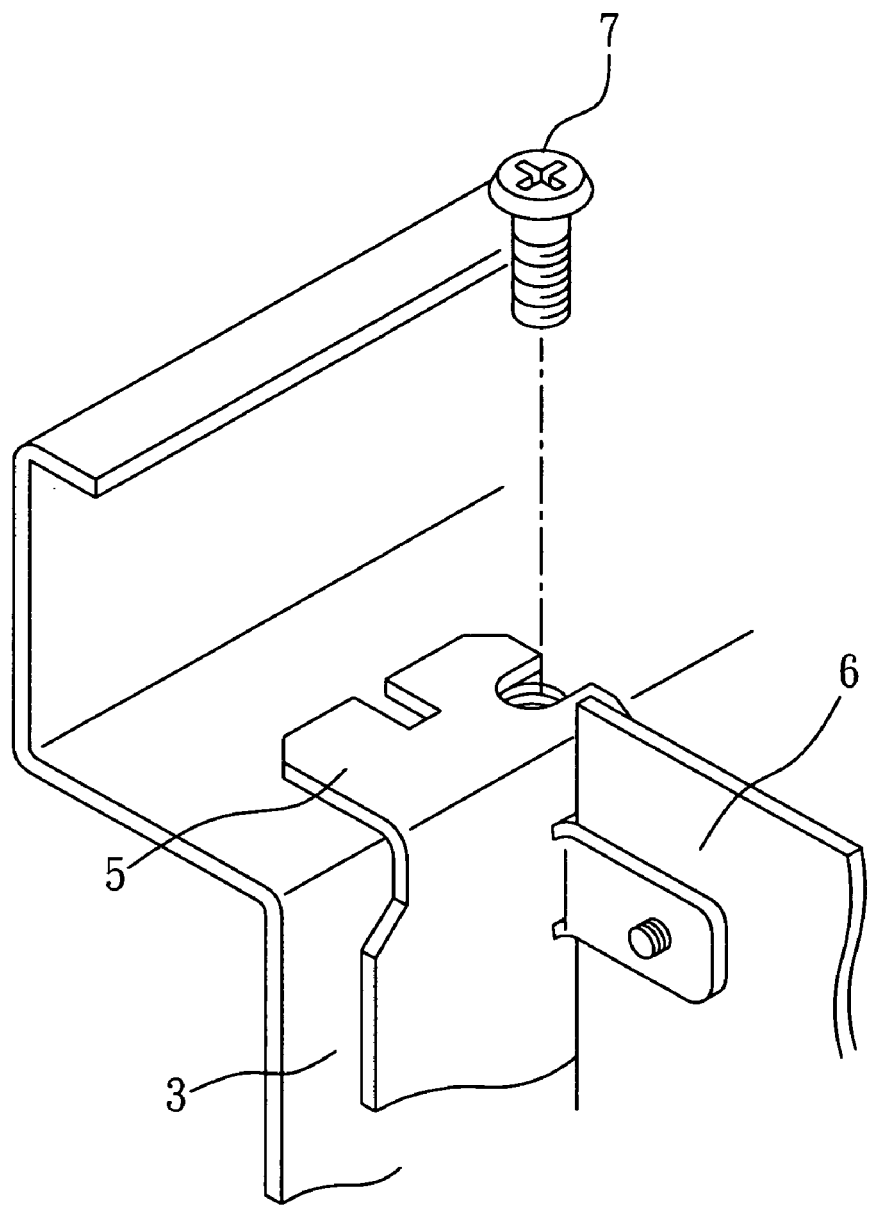
FIG. 1 (PRIOR ART) is a schematic view illustrating a conventional fixing of an functional extension card.
Figure 2:
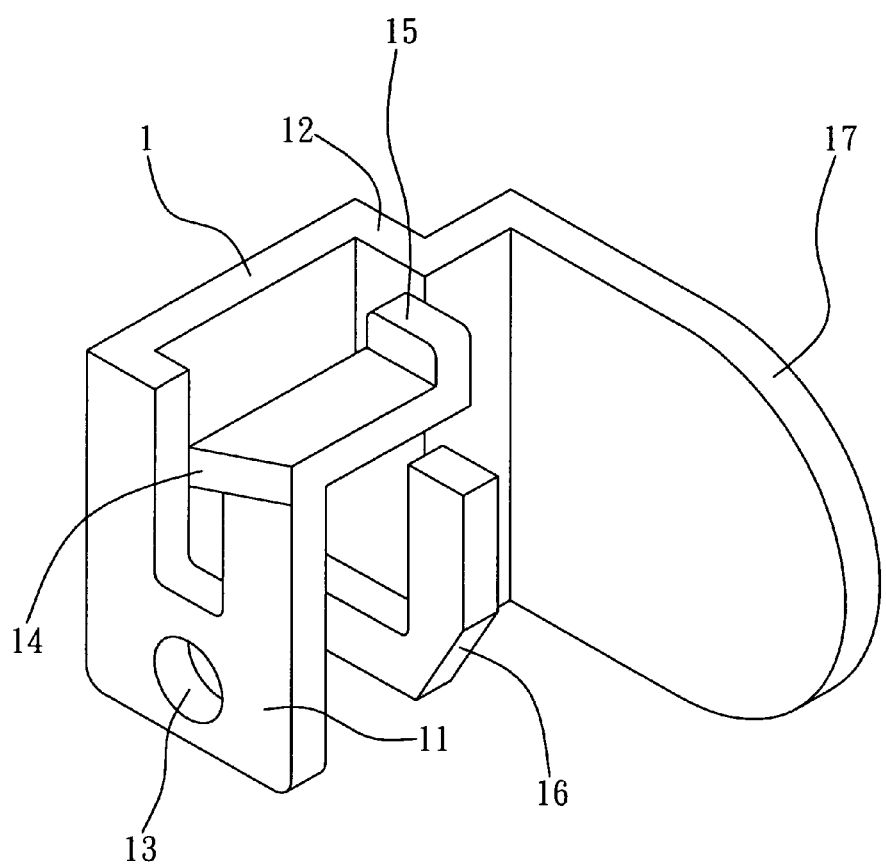
FIG. 2 is a schematic view illustrating the fixing mechanism for functional extension cards according to the invention.

Referring to FIG. 2, the fixing mechanism for functional extension cards according to the present invention is illustrated. As shown in the figure, a body 1 of the fixing mechanism disclosed by the present invention comprises a first side 11 and a second side 12 opposed to the first side 11. The first side 11 of the body 1 is provided with a spindle hole 13 for positioning that allows a fixing bolt to penetrate through a first positioning hole of a mechanical frame and further through the first side of the fixing body. A fixing portion 14 is disposed on the first side 11 in a protrusive manner for fixing the second positioning hole of the mechanical frame, an operating portion is provided at a connecting portion between the fixing portion 14 and the first side 11 that operates to release the fixing status of the fixing portion 14; a first restricting portion 16 is formed between the first side 11 and the second side 12 and collectively disposed on the body 1 to provide a restriction effect, wherein the first side 11 is a cross-sectional structure having a concave shape, and preferably has the characteristics of elasticity and deformation to facilitate coupling of the fixing portion 14 and operation of the operating portion 15.

Moreover, the body 1 of the fixing mechanism for functional extension cards of the invention include a first side 11 and a second side corresponding to the first side 11, wherein the second side 12 of the body 1 is provided with a second restricting portion 17 for providing a restricting effect, in this preferred embodiment, the spindle 13, the fixing portion 14, the operating portion 15, the first restricting portion 16, and the second restricting portion 17 are integrally and connectively disposed on the body 1. Preferably, the body 1 can be a plastic body, a metallic body, or a wooden body depending on the design choice. In this embodiment, the body 1 is a plastic body for facilitating mass production of the device that has elasticity and deformation characteristics. Note that the body 1 is not restrictive to plastic ones but can be constituted by metal in other embodiments, provided that the structure has sufficient strength and flexibility as required.

Figure 3:
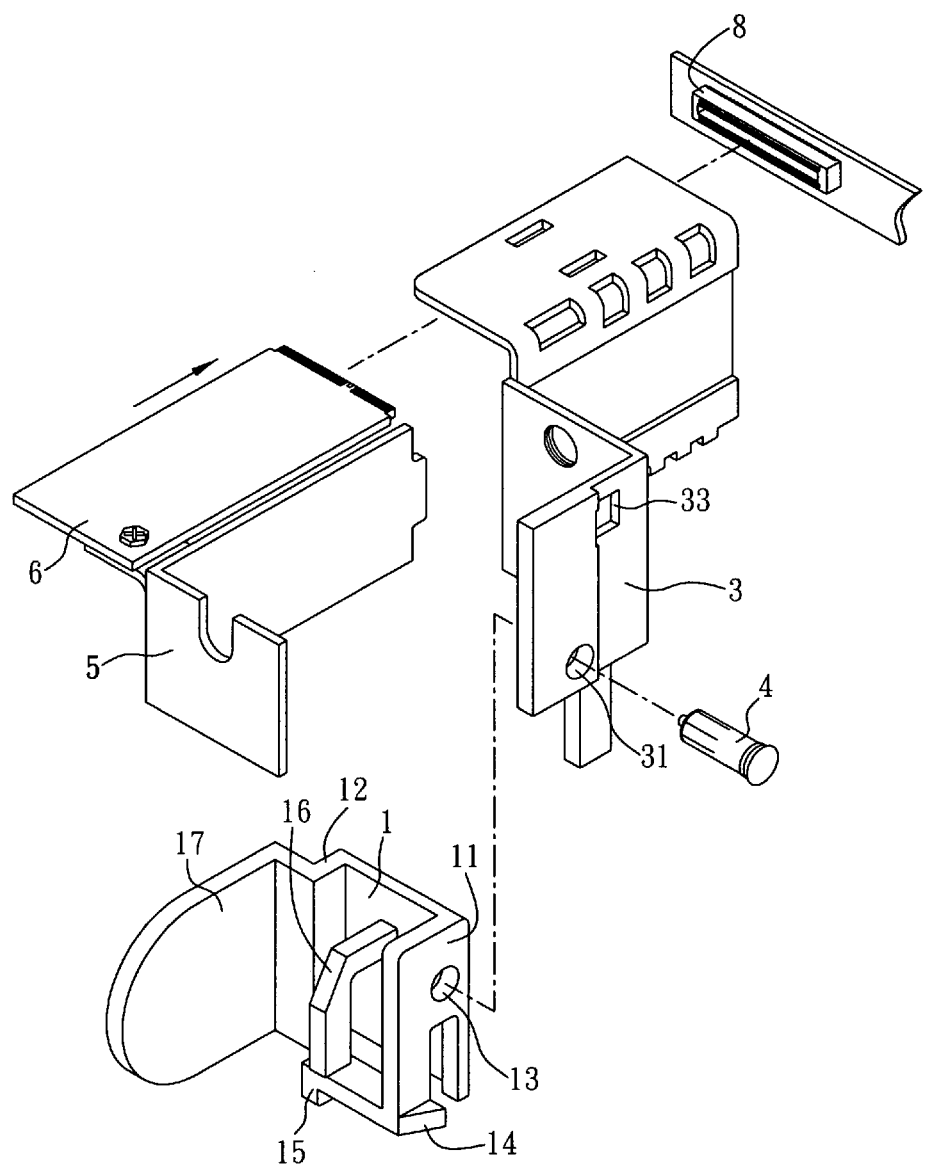
FIG. 3 is a schematic view illustrating the assembly of the fixing mechanism and a functional extension card according to the invention.
Figure 4:
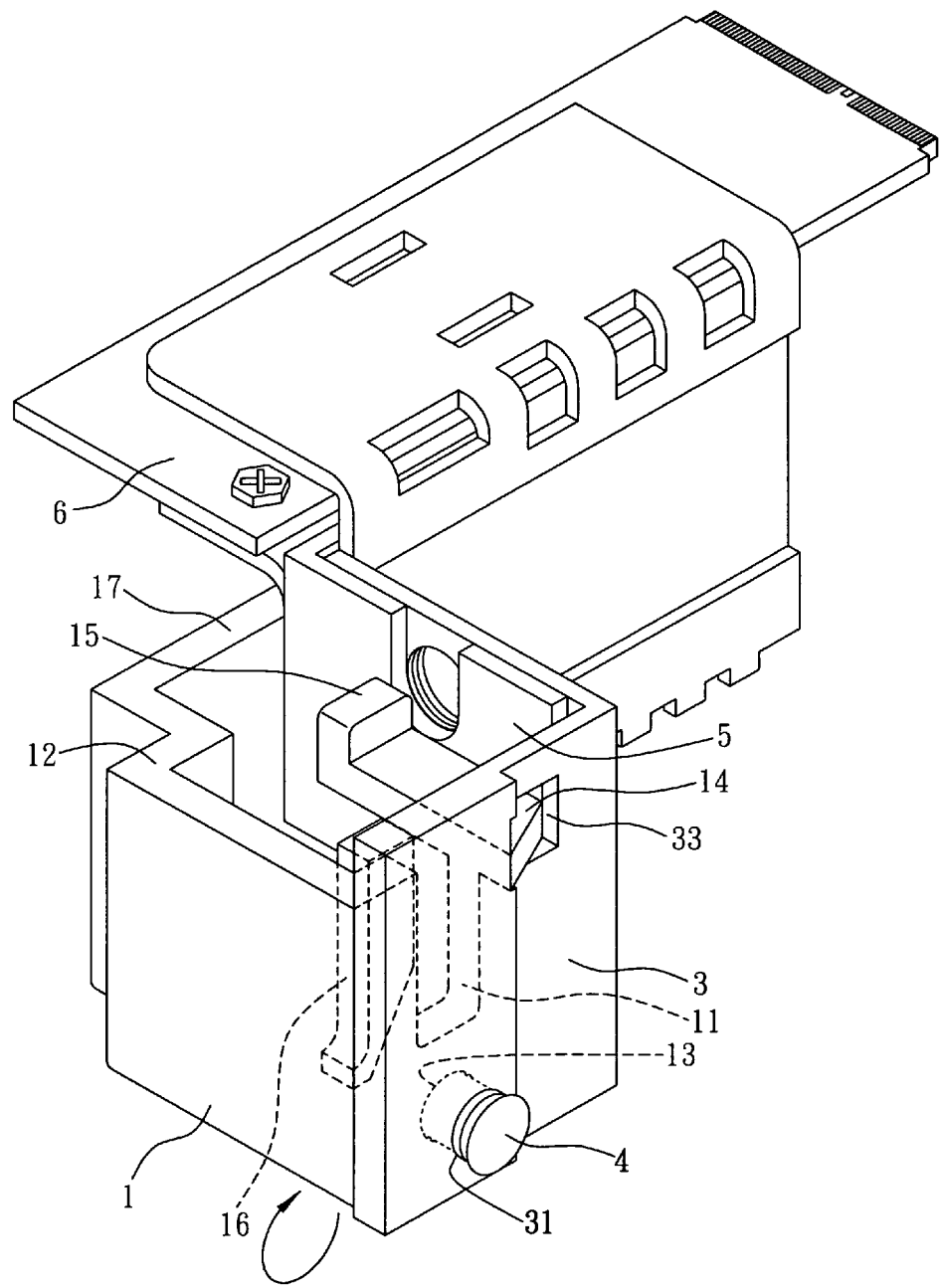
FIG. 4 is a schematic view illustrating a bayonet board of an functional extension card being fixed by the fixing mechanism in accordance with the invention.

Referring to FIG. 3, the assembly of the fixing mechanism of the invention with a functional extension card is illustrated. As shown, the spindle hole 13 on the first side 11 of the body 1 is adapted to provide for insertion of a fixing bolt into the first positioning hole 31 of the mechanical frame 3, and further into the spindle hole 13 to position the body 1 onto the mechanical frame 3 so that the body 1 is rotatable, wherein the fixing bolt 4 is a plastic structure, but it can be made of different materials such as rubber in other embodiments, so long as the constituent component serves well the purposes of mating with and positioning the body 1. Thereafter, the functional extension card 6 is inserted into the extension slot 8, referring now to FIG. 4, the fixing mechanism of the invention adapted for fixing a bayonet board of the functional extension card is depicted. As shown, the bayonet board 5 of the functional extension card 6 is affixed to a side of the mechanical frame 3, and via the positioning of the first positioning hole 31 of the mechanical frame 3 and the spindle hole 13 of the body 1, the body 1 rotates to enable the fixing portion 14 thereof to couple with the second positioning hole 33 of the mechanical frame 3, while the first restricting portion 16 on the first side 11 of the body 1 abuts against the bayonet board 5 on the mechanical frame 3, so as to prevent the possible detachment of the extension card 6 from its connecting bayonet board 5 caused by upward and downward vibrations, and the second restricting portion 17 on the second side 12 of the body 1 couples with the second positioning hole 33 of the mechanical frame 3 by the rotation of the body 1, allowing the second restricting portion 17 and the mechanical frame 3 to clip the bayonet board 5 between the second side 12 of the body 1 and the mechanical frame 3 to keep the bayonet board 5 from swinging, thereby positioning the body 1 and restricting the extension card from coming off that may result in bad contacts, and also the disposal of the fixing portion 14 allows for easy installation and secure positioning without using tools.

When switching the extension card 6 in the fixing mechanism of the invention, it requires only using the operating portion 15 of the body 1 to release the coupling of the fixing portion 14 of the body 1 and the second positioning hole 33 of the mechanical frame 3; the disposal of the fixing bolt 4 allows the body 1 to rotate to release the restriction of the first restricting portion 16 of the body 1 from connecting with the bayonet board 5 of the extension card 6, and further release the restriction of the second restriction portion 17 of the body 1 from separating the bayonet board 5 of the extension card 6, thereby allowing the extension card 6 and the bayonet board 5 thereof to be removed from the slot 8 for switching purposes.

In conclusion, the fixing mechanism of the invention is characterized in that a fixing bolt is adapted to fix the body of the fixing mechanism on the mechanical frame, and a spindle hole formed on the fixing body is used to position and rotate the fixing body, and further a fixing portion is provided for coupling with a first positioning hole on the mechanical frame, thereby restricting the bayonet board of a functional extension card to maintain the coupling of the extension card in the extension slot. Therefore, the fixing mechanism of the invention is easy to install without having to use any tool, and also it is easy to disassemble for replacement purposes and thus resolve the concerns of hot-pluggable safety to satisfy the consumers' requirements.

The aforementioned are only exemplary preferred embodiments of the present invention. The scope of the claims as stated below should be accorded the broadest interpretation so as to encompass various modifications and similar arrangements made to the herein described invention that fall within the spirit of the basic principles and technology of the present invention.

What is claimed is:

1. A fixing mechanism for fixing a functional extension card having a bayonet board to a mechanical frame having a first positioning hole and a second positioning hole, the fixing mechanism comprising:
    a fixing body having a first side and a second side opposed to the first side; a spindle hole formed on the first side of the fixing body, for allowing the fixing bolt to pass through the first positioning hole of the mechanical frame and further through the first side of the fixing body;
    a fixing portion disposed on the first side, for being fixed to the second positioning hole of the mechanical frame;
    an operating portion connectively disposed at an opposite direction of the first positioning hole that engages the fixing portion with the mechanical frame, the operating portion being adapted to release the fixing status of the fixing portion; and
    a first restricting portion formed between the first side and the second side and collectively disposed on the body, to restrict the functional extension card and the bayonet board to swing in a vertical direction.

2. The fixing mechanism according to claim 1, wherein the fixing body is one selected from the group consisting of a plastic body, a metallic body, and a wooden body.

3. The fixing mechanism according to claim 1, wherein the first side has a U-shaped cross section.

4. The fixing mechanism according to claim 3, wherein the first side having the U-shaped cross section is elastic.

5. The fixing mechanism according to claim 1, wherein the spindle hole is adapted for the fixing bolt to penetrate through such that the fixing body can rotate.

6. The fixing mechanism according to claim 1, wherein the fixing portion is a block body that has a slanting plane to facilitate coupling into the second positioning hole of the mechanical frame.

7. The fixing mechanism according to claim 1, wherein the operating portion is connectively disposed at a position where the fixing portion is connected to the first side.

8. The fixing mechanism according to claim 1, further comprising a second restricting portion connectively disposed on the fixing body for restricting the functional extension card and the bayonet board to swing in a lateral direction.

9. The fixing mechanism according to claim 8, wherein the second restricting portion is connectively disposed on the second side of the fixing body.

10. The fixing mechanism according to claim 8, wherein at least one of the spindle hole, the fixing portion, the operating portion, the first restricting portion, and the second restricting portion is integrally and collectively disposed on the fixing body.

* * * * *